H. F. SHAW.
Devices for Balancing Locomotive Driving-Wheels.
No. 151,721.  Patented June 9, 1874.
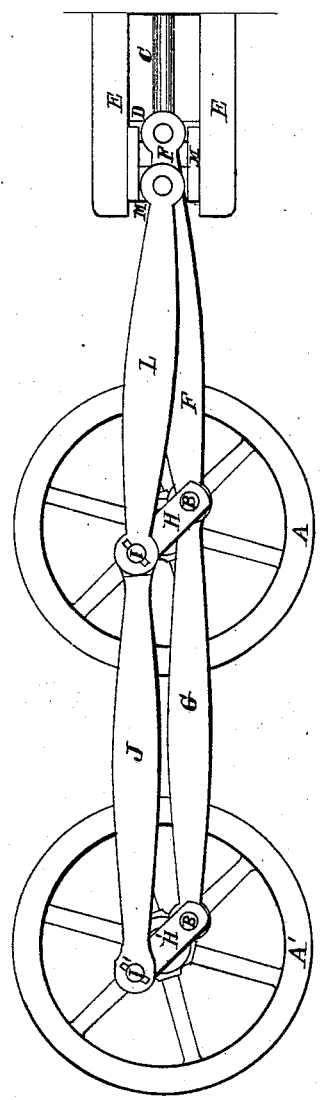
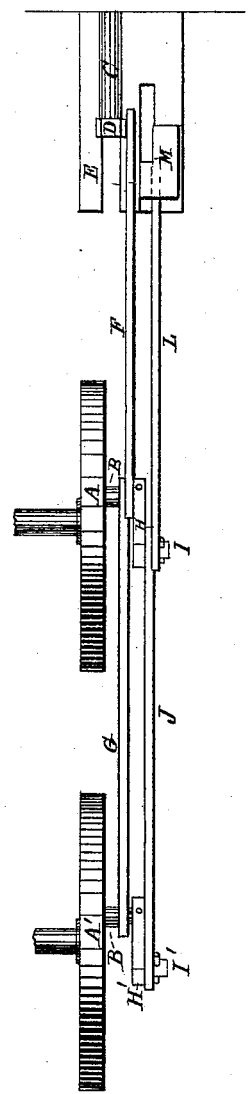
Witnesses.  FIG. 1.  FIG. 2.  Inventor.

UNITED STATES PATENT OFFICE.

HENRY F. SHAW, OF BOSTON, MASSACHUSETTS, ASSIGNOR OF ONE-HALF HIS RIGHT TO SOLOMON S. GRAY, OF SAME PLACE.

IMPROVEMENT IN DEVICES FOR BALANCING LOCOMOTIVE DRIVING-WHEELS.

Specification forming part of Letters Patent No. 151,721, dated June 9, 1874; application filed January 23, 1874.

*To all whom it may concern:*

Be it known that I, HENRY F. SHAW, of Boston, in the county of Suffolk and State of Massachusetts, have invented certain new and useful Improvements in Balancing Locomotive-Drivers and other Wheels, of which the following, taken in connection with the accompanying drawings, is a specification:

My invention relates to the manner of counterbalancing the crank, crank-pin, connecting-rod, and parallel rod of a locomotive, and may be applied in whole or in part in many places in general machinery with great advantage; and it consists in the use of a counter-balance weight, constructed and applied to the driving-wheels of a locomotive, or other revolving wheel intended to be run at a great speed, in such a manner that it shall bear the same relation to the revolving wheel and move in precisely the same manner as the object to be balanced. This is accomplished in the case of the locomotive-drivers by the use of a double crank upon each driving-wheel, and two parallel rods, of equal weight, mounted upon independent crank-pins upon opposite sides of the axes of said wheels, and equidistant therefrom. To balance the weight of the connecting-rod leading from the cross-head to the crank-pin on the driver, I use a supplementary rod, one end of which is connected to a crank-pin opposite to that to which the driving-rod is connected, and the opposite end connected to a cross-head arranged to move in slides, as will be more fully described. Heretofore the weight of the crank-pins, connecting-rods, and parallel rods attached to the driving-wheels of a locomotive have been counterbalanced by adding weight to the rim of the wheels on the side opposite to the crank-pins, this usually being done by filling or partially filling the space between two or more of the spokes upon that side with blocks of metal of sufficient weight to balance the extra parts upon the other side of the axis of the wheel. It is, however, utterly impossible to properly balance a wheel having such connections, and arranged to run at a high and variable rate of speed, in such a way, for the reason that the counter-weight, being at a greater distance from the axis of the wheel than the weight to be balanced, it travels through a much greater space at each revolution of the wheel, thereby greatly increasing the momentum of that side of the wheel, and causing the counter-weight to act like a sledge-hammer upon the rails at every revolution of the wheels. The same objections apply to a greater or less extent to the use of a counter-weight rigidly attached to and forming a part of the wheel, so as to revolve therewith, for the purpose of balancing the weight of the connecting-rods and parallel rods connected to a revolving wheel or wheels, for the reason that on account of the different conditions and movements of the weights and counter-weights, if the wheels are perfectly balanced at a certain given speed, an increase or reduction of the rate of speed will immediately throw the wheels out of balance, which cannot occur when the weight and counter-weights are constructed and applied to the wheels so as to operate and move through precisely similar tracks of equal lengths, and under the same conditions.

In the drawings, Figure 1 is a side elevation of a pair of locomotive driving-wheels with my improvements attached. Fig. 2 is a plan of the same.

A and A' are the driving-wheels, each provided with a crank-pin, B. C is the piston-rod of the driving-engine, the cylinder of which is not shown in the drawings. D is a cross-head, secured to the outer end of the piston-rod, and arranged to travel in the slides E; and F is a connecting-rod, leading from said cross-head D to the crank-pin B, set in the driving-wheel A. G is a parallel rod leading from the crank-pin B of the wheel A to the crank-pin B of the wheel A', all of the above being constructed and arranged in a well-known manner. To the outer ends of the crank-pins B are firmly secured the cranks H and H', extending across the center of the wheels, and having set in their opposite ends the crank-pins I and I', respectively, equidistant from the axes of said wheels with the crank-pins B. J is a parallel rod of equal weight with the rod G, and mounted upon the crank-pins I and I', and serving as a counter-weight to balance the weight of the rod G. L is a rod of equal weight with the connecting-rod F, and serving as a counter-weight to balance the same, one end of which is connected to the crank-pin I, while the opposite end is connected to the cross-head M, fitted to travel in a right line in slides or other suitable guides.

By the use of this arrangement of parts a perfect balance of all of the quick-moving parts of a locomotive is obtained under all the variations of speed to which they are subject.

What I claim as new, and desire to secure by Letters Patent of the United States, is—

1. The combination, with two or more locomotive-drivers or other rolling or revolving wheels, of the double cranks H and H′, the crank-pins I I′ and B, and two parallel rods, mounted upon said crank-pins upon opposite sides of the axes of said wheels, so as to balance each other, substantially as described.

2. In combination with a locomotive-driver or other wheel to which a rotary motion is imparted from a rod, piston, or cross-head reciprocating in a right line, the supplementary rod L, connected at one end to the crank-pin I, and at the other end to a cross-head, M, substantially as and for the purpose described.

3. The combination with two or more locomotive-drivers, or other rolling or revolving wheels, of the double cranks H H′, the crank-pins I I′ and B, two parallel rods, G and J, the rod F, connected at one end to the crank-pin B, and at the other end to a reciprocating cross-head or piston-rod and the counter-balance rod L, all constructed to operate as described, for the purpose specified.

Executed at Boston this 19th day of January, 1874.

HENRY F. SHAW.

Witnesses:
L. A. WOOD,
WM. P. EDWARDS.